United States Patent [19]

Takahashi

[11] Patent Number: 5,097,365
[45] Date of Patent: Mar. 17, 1992

[54] AUTOMATIC TRACKING APPARATUS FOR MAGNETIC DISK PLAYBACK HEAD

[75] Inventor: Masami Takahashi, Hiratsuka, Japan

[73] Assignee: Nikon Corporation, Tokyo, Japan

[21] Appl. No.: 441,534

[22] Filed: Nov. 27, 1989

[30] Foreign Application Priority Data

Nov. 30, 1988 [JP] Japan .................. 63-302623

[51] Int. Cl.$^5$ ............................................. G11B 21/10
[52] U.S. Cl. ................................................. 360/77.06
[58] Field of Search ...................................... 360/77.06

[56] References Cited

U.S. PATENT DOCUMENTS 4,445,153 4/1984 Fujimoto et al. ............... 360/77.06

Primary Examiner—Robert S. Tupper
Attorney, Agent, or Firm—Shapiro and Shapiro

[57] ABSTRACT

Automatic tracking apparatus includes a playback head, a driver for driving the playback head, and a controller for controlling the driver. The playback head is arranged to play back the information recorded on an arbitrary track on a disk-shaped magnetic recording medium. The driver is arranged to cause the playback head to move on the disk-shaped magnetic recording medium approximately in the radial direction. The controller causes the driver to move the head from an arbitrary track to the desired track step-by-step, sampling the output from the playback head within a predetermined range. Thus, the playback head is located at a position corresponding to the maximum level from among the sampled outputs.

6 Claims, 3 Drawing Sheets

AUTOMATIC TRACKING APPARATUS FOR MAGNETIC DISK PLAYBACK HEAD

BACKGROUND OF THE INVENTION

1. Field of the Invention

The present invention relates to a magnetic recording/playback apparatus for use in an electronic still camera of the type which employs a magnetic disk as a recording medium and, more particularly, to an automatic tracking apparatus for positioning a playback head in an optimum state with respect to a recording track.

2. Related Background Art

A conventional type of automatic tracking apparatus is arranged to move a playback head by means of a stepping motor and a moving mechanism. The playback head is moved to a desired track at a high speed and tracking control is started when the desired track is reached.

In another known arrangement, a playback head is moved by a small distance at a time while tracking control is being continuously performed until the desired track is reached.

Such a conventional type of automatic tracking apparatus, however, involves a number of problems. One problem is that the tracking speed is relatively slow. Another problem is that the position of the playback head may be offset from the desired track position. The reason for such offsetting is that a difference occurs between the one-track pitch of a head shifting mechanism and the actual one-track pitch of a magnetic sheet owing to various factors such as the thermal expansion or shrinkage of the magnetic disk or variations in individual track-to-track intervals resulting from the head shifting mechanism, although such variations are normally allowable ones which may occur in forming a recording track on the magnetic disk. Particularly when the playback head is moved over some tens of tracks, it may be possible that offsetting of ½ pitch track or thereabouts takes place.

If an offset occurs between the desired track position and the position to which the playback head has moved and if the desired track position is, for example, the center of the desired track (which is given by setting the distance to the track center determined by the standards concerned), the step position of the playback head is shifted to an intermediate position between successive tracks due to such offsetting, that is to say, a valley between successive playback RF envelope levels. The offsetting may lead to, for example, the problem that the subsequent tracking becomes unable to be reliably completed or tracks may be regarded as being unrecorded.

SUMMARY OF THE INVENTION

It is therefore an object of the present invention to provide an automatic tracking apparatus capable of moving a playback head at high speeds to the position where accurate tracking is enabled.

To this end, in accordance with the present invention, there is provided an automatic tracking apparatus arranged to move to an arbitrary track a playback head for playing back signals recorded on a plurality of tracks on a disk-shaped magnetic recording medium.

The automatic tracking apparatus according to the present invention includes playback head means, drive means for driving the playback head means, and control means for controlling the drive means. The playback head means is arranged to be located close to any of a plurality of tracks and play back the information recorded on the track, this plurality of tracks being concentrically or spirally formed approximately at predetermined intervals on a disk-shaped magnetic recording medium. The drive means is arranged to cause the playback head means to move on the disk-shaped magnetic recording medium approximately in the radial direction. The control means causes the drive means to move the playback head means from a position close to an arbitrary track to a position close to a desired track. The control means is arranged to cause the playback head means to move on the basis of the number of tracks over which the playback head means is to move at the predetermined intervals and then to sample the output from the playback head means within a range which is shorter than the aforesaid predetermined interval. The control means controls the drive means so that the playback head means is located at a position corresponding to the maximum level from among the sampled outputs.

In a first embodiment of the automatic tracking apparatus according to the present invention, while a playback head is being moved from a particular unrecorded track to an adjacent track, the playback head is stepped at least three times at predetermined intervals of a track pitch or less so that the playback signal levels at the respective step positions are obtained. If all the playback signal levels are lower than a threshold, it is determined that the track concerned is an unrecorded track. If at least one of the playback signal levels exceeds the threshold, the playback head is located at the position where the maximum signal level has been obtained and tracking control is then started.

Specifically, the playback head is stepped by a ½ track pitch and then stepped twice by a ¼ track pitch at a time.

In a second embodiment of the automatic tracking apparatus according to the present invention, while a playback head is being moved from a particular recorded track to a track which is two tracks away or while the playback head is being moved from a particular unrecorded track to an arbitrary desired track, the playback head is stepped at least twice at predetermined intervals of a track pitch or less from a position before the center of the desired track so that the playback signal levels at the respective step positions are obtained. If at least one of the playback signal levels is lower than a threshold, it is determined that the track concerned is an unrecorded track. If all the playback signal levels exceed the threshold, the playback head is located at the position where the maximum signal level has been obtained and tracking control is then started.

Specifically, the playback head is stepped twice by a ¼ track pitch at a time from a position which is ½ track pitch before the center of the desired track or twice by a ¼ track pitch at a time from a position which is ¼ track pitch before the center of the desired track.

The automatic tracking apparatus of the present invention which has the above-described arrangement and construction provides a number of advantages. Since the position of the playback head is not determined on an unrecorded track, if the playback head is moved from the unrecorded track, the playback head may stop at a position corresponding to a valley between successive RF envelope levels, that is, at an intermediate position between adjacent tracks. In the present invention, the playback head is subsequently stepped, for example, at a ¼ track pitch at a time and signal levels at three step positions are sampled. Of the three sampled signal levels, the position corresponding to the maximum signal level is used as the start position of tracking control. With this apparatus, it is possible to reliably prevent the problem that the tracking control is unable to be normally completed or that a recorded track is erroneously regarded as an unrecorded tracked. It is also possible to move the playback head to the position where accurate tracking is enabled.

Since a variation in the track interval between each recorded track and an adjacent track is extremely small, the playback head can be moved from an arbitrary recorded track to the adjacent track at a high speed of one track pitch which compares with the speed of the conventional apparatus.

The other objects, features and advantages of the present invention will become apparent from the following detailed description, taken in conjunction with the accompanying drawings.

DETAILED DESCRIPTION OF THE PREFERRED EMBODIMENTS

Figure 1:
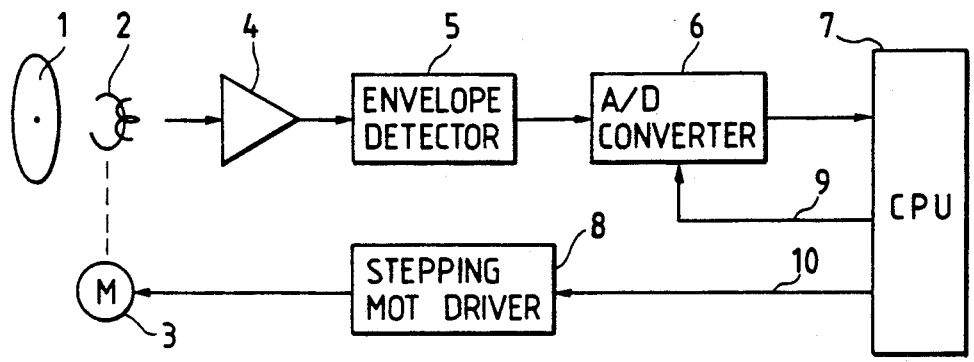
FIG. 1 is a block diagram showing one embodiment of the present invention.

FIG. 1 is a block diagram showing one embodiment of the present invention.

As shown in FIG. 1, a magnetic disk 1 which serves as a disk-shaped magnetic medium is rotated at a fixed speed by a servo motor (not shown). A playback head 2 is moved by a stepping motor 3 driven by a stepping-motor driver 8. The RF signal output from a playback amplifier 4 is converted into a voltage level by an envelope detecting circuit 5, and the voltage level is then converted into, for example, 8-bit digital data by an A/D converter 6. The 8-bit digital data thus obtained is supplied to a CPU 7. The CPU 7 outputs to the A/D converter 6 a timing pulse 9 for fetching digital data and outputs a stepping-motor driving pulse 10 to the stepping-motor driver 8.

FIGS. 2A to 2E are explanatory views showing the pattern of movement control which is executed to move the playback head 2 in the embodiment of FIG. 1 to the position where tracking control is possible.

Figure 2A:
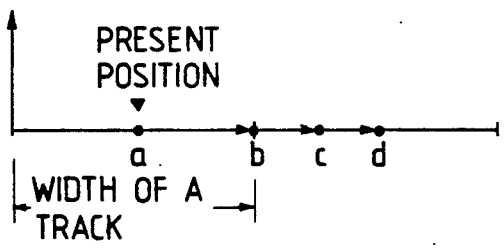
FIGS. 2A to 2E are explanatory views which serve to illustrate a control process in the embodiment of FIG. 1.
Figure 2B:
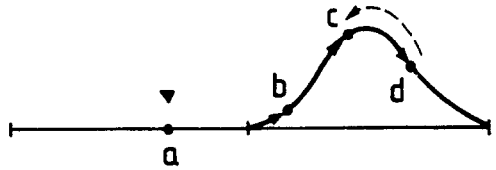

FIGS. 2A and 2B show control which is executed to move the playback head 2 from the present position to an adjacent track, and the present position corresponds to a particular unrecorded track. In FIG. 2A, there is shown a case where the adjacent track is an unrecorded track, while, in FIG. 2B, there is shown a case where the adjacent track is a recorded track.

Referring first to FIG. 2A, when the playback head 2 is to be moved from the present position a corresponding to the unrecorded track to the adjacent track, the playback head 2 is stepped by a ¼ track pitch and moved to a position b. Subsequently, the playback head 2 is moved twice by a ¼ track pitch at a time and is thereby passed through positions c and d in sequence. Thus, the playback output at each of the step positions b, c and d is obtained. In this case, since the playback output at each of the positions b, c and d is approximately zero which is lower than a predetermined threshold, it is determined that the adjacent track is an unrecorded track.

Referring next to FIG. 2B, in a manner similar to that explained in connection with FIG. 2A, a playback output is obtained at the position b to which the playback head 4 has been moved by a ¼ track pitch, then another playback output is obtained at the position c to which the playback head 4 has been moved by a ¼ track pitch, and then another playback output is obtained at the position c to which the playback head 4 has been moved by an additional ¼ track pitch. In this case, any of the three playback outputs exceeds a predetermined threshold VTH. Accordingly, the playback head 4 is moved back to a position corresponding to the maximum level of the three playback outputs, that is, the position c, and tracking control is started.

Figure 2C:
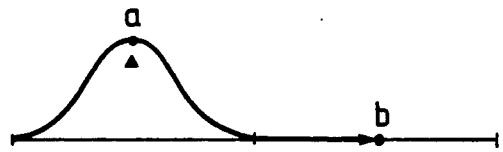
Figure 2D:
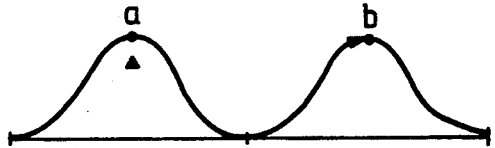

FIGS. 2C and 2D show control which is executed to move the playback head 2 from the present position a to an adjacent track, and the present position a corresponds to a particular recorded track. In FIG. 2C, there is shown a case where the adjacent track is an unrecorded track, while, in FIG. 2D, there is shown a case where the adjacent track is a recorded track.

In general, variations in the track intervals of recorded tracks are extremely small. Accordingly, when the playback head 2 is to be moved from the present position a corresponding to the recorded track to the adjacent track as shown in FIGS. 2C and 2D, the playback head 2 is stepped by one track pitch and located at the position b. If the playback output at the position b is lower than the threshold as shown in FIG. 2C, it is determined that the track concerned is an unrecorded track. If the playback output at the position b exceeds the threshold as shown in FIG. 2D, it is determined that the track concerned is a recorded track, and tracking control is immediately started.

Figure 2E:
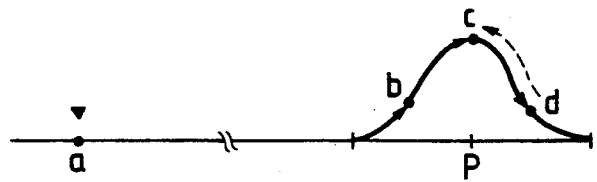

FIG. 2E shows control which is executed to move the playback head 2 from the present position a to an arbitrary desired track by a distance of two tracks or more, and the present position a may be an unrecorded or recorded track. Since the position on the desired track which is determined by the standards concerned is known, the playback head 2 is moved up to the desired track and is then stepped by a ¼ track pitch at a time from a position which is a ¼ track pitch before the position P on the desired track which is determined by the standards. The playback outputs at the three points b, c and d are obtained, respectively. Thus the playback head 2 is returned to the position where the maximum playback output is obtained, that is, the point c, and tracking control is immediately started.

In the case of control which is executed to move the playback head 2 to the arbitrary desired track position shown in FIG. 2E, that is, a track which is two tracks or more ahead, sampling may be performed at three points which are spaced part at intervals of a ¼ track about the center P on the desired track.

Figure 3:
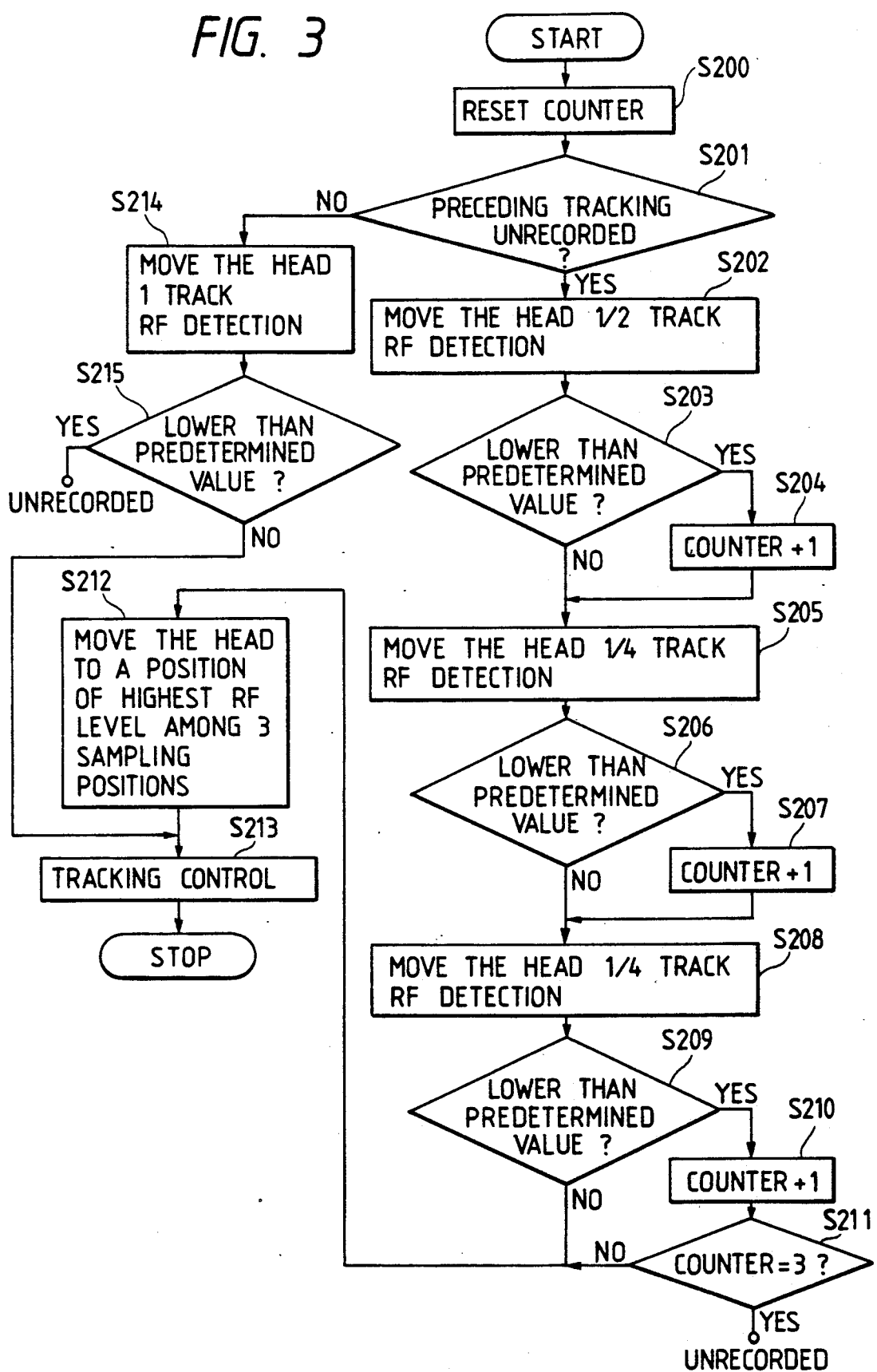
FIG. 3 is a flow chart showing the control executed in the embodiment of FIG. 1.

FIG. 3 is a flow chart showing tracking control executed by the CPU 7 shown in the embodiment of FIG. 1. This flow chart is applied to a case where the playback head is moved from the present track to an adjacent track.

In FIG. 3, when a playback operation is started, a counter is reset in Step S200. If the playback head is to be moved, for example, from the present track to an adjacent track, it is determined in Step S201 whether or not the result of the preceding tracking indicates an unrecorded track. In the case of an unrecorded track, the process proceeds to Step S202, where the playback head is moved by a ½ track and the RF envelope level transmitted from the playback head is sampled. Subsequently, in Step S203, to determine whether the track concerned is a recorded track or an unrecorded track, the threshold VTH of a predetermined level is compared with the detected RF level. If the RF level is lower than the threshold VTH, the value of the counter which was reset in Step S200 is incremented by one before a playback operation is started, and the process proceeds to Step S205. If it is determined in Step S203 that the detected RF level exceeds the threshold VTH, the process proceeds to Step S205.

In Step S205, RF detection is performed after the playback head has been moved by a ¼ track. In Step S206, it is determined whether or not the detected RF level is lower than the threshold VTH. If the detected RF level is lower than the threshold VTH, the value of the counter is incremented by one in Step S207. If the track concerned is an unrecorded track, the value of the counter is two. If the detected RF level exceeds the threshold VTH, the process proceeds from Step S206 to Step S208.

In Step S208, the playback head 2 is moved by an additional ¼ track and RF detection is performed. In the next step S209, it is determined whether or not the detected RF level is lower than the threshold VTH. If the detected RF level is lower than the threshold VTH, the process proceeds to Step S210, where the value of the counter is incremented by one. In the following Step S211, it is determined whether or not the value of the counter is equal to three. If the value of the counter is equal to three, that is, if all the RF levels detected at the time of the three step movements in Steps S202, S205 and S208 are lower than the threshold, the process proceeds to an "unrecorded" process.

If the RF detected level in Step S209 exceeds the threshold VTH or if the value of the counter is lower than three in Step S211, the process proceeds to Step S212, where the playback head is moved to the position where the maximum RF level has appeared from among the three sampling positions selected in Steps S202, S205 and S208. In Step S213, tracking control is started and a sequence of process steps is thus completed.

If it is determined in Step S201 that the result of the preceding tracking indicates a recorded track, the process proceeds to Step S214, where the playback head is moved by one track and RF detection is performed. If the detected RF level is lower than the threshold VTH, it is determined that the track concerned is an unrecorded track. If the detected RF level exceeds the threshold VTH, the process proceeds to Step S213, where tracking control is started.

Figure 4:
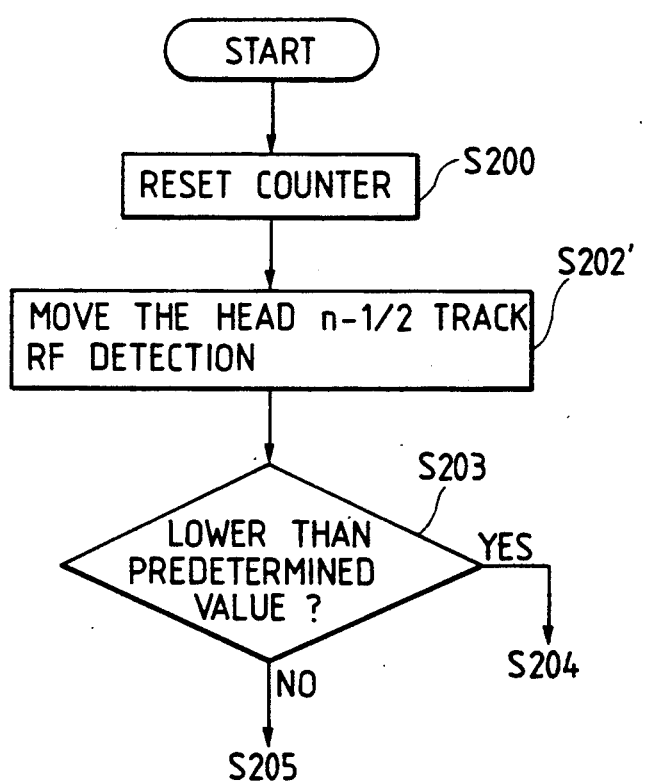
FIG. 4 is a flow chart showing the essential part of control executed in another embodiment.

FIG. 4 is a flow charge showing control which is executed in another embodiment to move the playback head to a desired track which is two tracks or more away from a particular unrecorded or recorded track. Since the steps excluding the steps shown in FIG. 4 are similar to those of the flow chart of FIG. 3, they are omitted. Specifically, Steps S201, S202, S214 and S215 shown in FIG. 3 are deleted, and a new step S202′ is added. By way of example, a case where the playback head is to be moved from an arbitrary present position 1 to a desired track is considered. After the counter has been reset in Step S200, the process proceeds to Step S202′, where the movement of the playback head is started. If n represents the number of tracks over which the playback head is to be moved, the playback head is moved by a $(n-\frac{1}{4})$ track pitch up to the first sampling point b. At this point b, the RF envelope level transmitted from the playback head is sampled by the CPU 7 or the like. In the following Step S203, the threshold VTH is compared with the detected RF level at the point b. The subsequent process is substantially the same as that explained in connection with Steps S203–S213 of FIG. 3. Specifically, the playback head is moved to a sampling point (in this case, the point c of FIG. 2E) which indicates the maximum detected RF level from among the three sampling points. In this case, since it is possible to assure the RF detected level which is required for ordinary tracking control, accurate tracking can be started. If the detected RF level is lower than the threshold value at every sampling point, it is determined that the desired track is an unrecorded track. In this case, since accurate tracking is impossible, an indication to that effect is provided on a monitor or the like and the tracking sequence may be completed. Alternatively, the playback head may be moved to the next track and tracking may be resumed there.

As is apparent from the foregoing, in accordance with the present invention, it is possible to move the playback head to a position close to a peak of the RF envelope level of the desired track irrespective of the position of the playback head. Accordingly, it is possible to reduce a variation in the time required for each cycle of tracking control. Also, since accurate tracking is achieved irrespective of the position of the playback head, the present invention is sufficiently effective even in combination with algorithms arranged to search for a recorded track while automatically skipping unrecorded tracks.

I claim

1. An automatic tracking apparatus suitable for use with a disk-shaped magnetic recording medium on which a plurality of tracks are formed at approximately a predetermined interval approximately in the radial direction, comprising:

playback head means for playing back information recorded on said disk-shaped magnetic recording medium;

drive means for causing said playback head means to move approximately along the radial direction of said disk-shaped magnetic recording medium;

control means for causing said drive means to move said playback head means from a position close to an arbitrary track to a position close to a desired track, said arbitrary track being adjacent to said desired track in said radial direction, said control means causing said drive means to move said playback head means toward said desired track by a distance approximately half said predetermined interval and then to move said playback head means a plurality of times at sampling intervals, each being shorter than said predetermined interval, thereby sampling the output of said playback head means at a plurality of different positions; said control means controlling said drive means so that said playback head means is located at a position corresponding to the maximum level from among said sampled outputs when at least one of the sampled outputs exceeds a predetermined threshold.

2. An automatic tracking apparatus suitable for use with a disk-shaped magnetic recording medium on which a plurality of tracks are formed at approximately a predetermined interval approximately in the radial direction, comprising:

playback head means for playing back information recorded on said disk-shaped magnetic recording medium;

drive means for causing said playback head means to move approximately along the radial direction of said disk-shaped magnetic recording medium;

control means for causing said drive means to move said playback head means from a position close to an arbitrary track to a position close to a desired track, said arbitrary track being a track that is not adjacent to said desired track in said radial direction, said control means causing said drive means to move said playback head means toward said desired track by a distance that is equal to the total of the predetermined intervals between said arbitrary track and said desired track minus a sampling interval that is shorter than said predetermined interval, and then to move said playback head means a plurality of times at said sampling interval, thereby sampling the output of said playback head means at a plurality of different positions; said control means controlling said drive means so that said playback head means is located at a position corresponding to the maximum level from among said sampled outputs when at least one of the sampled outputs exceeds a predetermined threshold.

3. An automatic tracking apparatus according to claim 1 or 2, wherein each output from said playback head means is an RF signal that is envelope-detected for comparison with said predetermined threshold.

4. An automatic tracking apparatus according to claim 1 or 2, wherein said sampling interval corresponds to approximately one quarter of said predetermined interval.

5. An automatic tracking apparatus according to claim 1 or 2, wherein when the playback head means is located at said position corresponding to the maximum level from among said sampled outputs, said control means determines that said desired track is a track on which information is recorded and initiates tracking control to maintain said playback head means on said desired track, and when all said sampled outputs are lower than said threshold, said control means determines that said desired track is an unrecorded track and provides no tracking control over said playback head means with respect to said desired track.

6. An automatic tracking apparatus according to claim 5, wherein each output from said playback head means is an RF signal that is envelope-detected for comparison with said predetermined threshold.

* * * * *